United States Patent [19]

Vossieck

[11] 4,436,314
[45] Mar. 13, 1984

[54] SLIDE RING SEAL WITH SPRING TO RADIALLY BIAS IN OPPOSITE RADIAL DIRECTIONS

[75] Inventor: Paul Vossieck, Burscheid, Fed. Rep. of Germany

[73] Assignee: Goetze AG, Burscheid, Fed. Rep. of Germany

[21] Appl. No.: 422,191

[22] Filed: Sep. 23, 1982

[30] Foreign Application Priority Data

Jan. 25, 1982 [DE] Fed. Rep. of Germany ....... 3202274
Jun. 18, 1982 [DE] Fed. Rep. of Germany ....... 3222759

[51] Int. Cl.$^3$ .............................................. F16J 15/36
[52] U.S. Cl. ........................................ 277/86; 277/90; 277/92; 277/93 SD
[58] Field of Search ...................... 277/81 R, 84–86, 277/88, 90, 92, 93 R, 93 SD

[56] References Cited

U.S. PATENT DOCUMENTS

Re. 23,898 11/1954 Haake ..................... 277/90
2,884,268 4/1959 Amirault et al. ................. 277/90 X
3,578,803 5/1971 Huhn ..................... 277/85
4,063,741 12/1977 Kerr ..................... 277/90 X

FOREIGN PATENT DOCUMENTS 224405 10/1959 Australia .............................. 277/86
1061145 7/1959 Fed. Rep. of Germany ........ 277/88
1858504 9/1962 Fed. Rep. of Germany .
2703104 7/1978 Fed. Rep. of Germany ........ 277/88
2921669 12/1980 Fed. Rep. of Germany .
888118 1/1962 United Kingdom .

Primary Examiner—Robert S. Ward
Attorney, Agent, or Firm—Spencer & Frank

[57] ABSTRACT

A slide ring seal having a slide ring with a central axis and a circumferential face; a tubular sleeve member including a member overlapping at least a portion of the circumferential face of the slide ring and an adhering part integral with the bellows and extending axially from the slide ring along the central axis; and a compression spring approximately conical in configuration positioned within the tubular sleeve member having at least three spring turns positioned in different radial planes with respect to the central axis at least two of said spring turns having different diameters, and wherein the spring turns having the smallest and largest diameter cooperate with the adhering part and that portion of the bellows which overlaps the slide ring to radially bias the slide ring seal in opposite directions.

19 Claims, 4 Drawing Figures

SLIDE RING SEAL WITH SPRING TO RADIALLY BIAS IN OPPOSITE RADIAL DIRECTIONS

BACKGROUND OF THE INVENTION

The present invention relates to seals for sealing relatively rotating machine parts and, more particularly, a slide ring seal of the type comprising a slide ring having a central axis and a circumferential face, a tubular sleeve member formed of a bellows which encircles and engages at least a portion of the circumferential face of the slide ring and an adhering part constituting an integral continuation of the bellows and extending in a generally axial direction away from the slide ring. The slide ring seal further comprises an approximately conically wound compression spring positioned within the tubular sleeve member in the zone of the adhering part and the bellows.

A slide ring seal of this type is known from German Offenlegungschrift (Application Published Without Examination) No. 2,921,669. A support housing provided in the zone of the inner circumferential face of the adhering part serves to radially shape the latter. A cylindrical compression spring extends axially between the support housing and the bellows. In the zone of the bellows, the slide ring is radially clamped in such a manner that the diameter of the bellows is larger than the inner diameter of the spring turns.

A slide ring seal of similar construction as described above is shown in British Pat. No. 888,118. This structure, however, has no support housing; its function is assumed by a compression spring which includes an initial cylindrical portion and a stepped, approximately conical portion. The spring turn of smallest diameter engages a groove formed in the bellows axially adjacent the slide ring. Apart from the complex shape of the bellows, a transmission of torque from slide ring to the adhering part is poor, since the spring merely carries out guiding functions.

Further, German Gebrauchsmuster (Utility Model) No. 1,858,504 discloses a slide ring seal in which the end turns of the cylindrical spring surround the bellows and further, on one side the spring exerts a radial pressure on the slide ring and, when installed, it exerts, on the other side, a radial pressure on the shaft with the intermediary of the bellows. Again, the diameter of the bellows is larger than the inner diameter of the spring turns. In this construction, the bellows is radially so thick that the spring cannot exert any radial force on the shaft; rather, this force is applied by the bellows itself since in seals of this type the inner diameter of the elastomer member is, as a rule, designed to be smaller than the diameter of the shaft. Thus, the elastomer member expands when it is axially pressed onto the shaft and circumferentially engages the same under internal radial tension.

SUMMARY OF THE INVENTION

It is an object of the present invention to provide an improved slide ring seal in which, besides its guiding properties, the spring ensures, with simple means, an optimum torque transmission from the slide ring to the adhering part.

In accordance with the invention, this is achieved by providing a spring having at least three turns which are arranged on different radial planes within the shaft seal. The spring turns having the smallest and the largest diameter cooperate with the adhering part and with that portion of the bellows which carries the slide ring to radially bias the slide ring seal in opposite directions.

By means of the above-outlined simple, as well as economical solution, the slide ring is securely held in the bellows and in the installed state, the adhering part is pressed into a corresponding receiving bore. The radial spring forces are preferably greater in the installed state of the slide ring seal than prior to installation.

In a preferred embodiment, the spring has three turns and the middle turn has a radial height which corresponds to about the average radial height of the other two spring turns and is positioned preferably in the middle of the axial distance between the other two turns.

According to a further feature of the invention, the compression spring is designed such that two or more consecutive turns are provided in the zone of the adhering part and/or in the zone of the bellows and are so wound that they are axially biased with respect to one another. This advantageously results in a stable spring configuration in those zones, ensuring that the slide ring seal is securely pressed into the receiving bore, thus preventing the elastomer adhering part from sliding off the spring and that canting is securely eliminated. It is a further feature of the invention that the above mentioned consecutive turns of the compression spring all exert radial forces on the circumferential faces of the corresponding parts of the slide ring seal thus ensuring a positive transmission of torque, even in extreme situations.

It is still another feature of the invention to have the spring exert different radial and axial forces on the members connected to the spring by giving the individual turns different cross sections. This can be effected, for example, by upsetting certain portions of the spring either before or after winding.

According to another preferred embodiment, the turns of the compression spring positioned in the zone of the adhering part and/or in the zone of the bellows is eccentrically wound in such a manner that the turns, starting from the end face of the adhering part and/or the bellows are wound larger or smaller radially in the direction of the respective circumferential face. This is to ensure that during the axial compression of the slide ring seal, while in the installed state, the penultimate turn does not snap out axially from under the last turn and thus inhibit the functioning of the slide ring. Furthermore, this ensures an increase in the radial force with which the adhering part presses against the corresponding bore of a receiving member or with which the bellows presses against the slide ring.

According to a further feature of the invention, at least the first two turns of the compression spring positioned in the zone of the adhering part and/or in the zone of the bellows are affixed to each other. With this arrangement, essentially the same advantages as described above are achieved, i.e. the penultimate turn is prevented from snapping out from under the last turn under axial pressure. The affixation of the spring turns to one another can be achieved by mechanical clamping; however, spot welding or gluing of the respective turns is preferred.

When the slide ring seal is in the installed state, the greatest forces to be transmitted generally occur in the zone of the adhering part. Therefore, according to another feature of the invention, the compression spring exerts a greater radial force on the adhering part than on the bellows in order to compensate for any malfunctions that may occur during the operation.

The invention ensures that, due to the elasticity of the spring, the mounting (axial pressing-in) of the slide ring seal is relatively easy and that the adhering part, due to the radially acting spring force, fits well into the receiving bore and that there also is a good transmission of torque from the slide ring to the adhering part.

It will be understood that the cross-sectional shape of the spring wire may be determined dependent upon the particular operational environment.

DETAILED DESCRIPTION OF THE PREFERRED EMBODIMENTS

Figure 1:
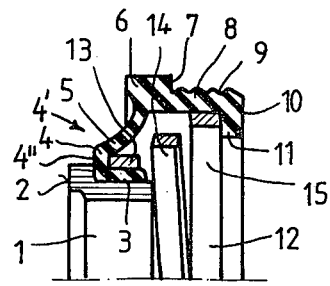
FIG. 1 is an axial sectional view of a preferred embodiment of the invention.

The slide ring seal shown in FIG. 1 comprises a slide ring 1 having a slide face 2 and, remote therefrom, a stepped length portion of reduced diameter including a circumferential face 3. A sleeve member 4' includes a bellows 4 whose end encircles the face 3 of the slide ring 1 and an adhering part 8 integral with and being an axial continuation of the bellows 4.

The bellows 4 includes a front portion 4" which is radially adjacent the slide ring 1 and which has an approximately U-shaped cross-sectional profile. The bellows 4 then continues in a substantially radial portion, having bulging part 5. A circumferential zone 6 extends from the bulging part 5 generally parallel to the central axis of slide ring 1 and is adjoined by an axial abutment 7, from which axially extends the adhering part 8. The latter is provided with an undulated surface 9 for the purpose of assuring better clamping in its receiving member (not shown). The adhering part 8 includes an end face 10, a holding claw 11 formed integrally with the end face 10 and oriented radially inwardly.

A compression spring 12 is located within sleeve member 4' and is positioned axially between adhering part 8 and the U-shaped portion 4" of bellows 4. When the slide ring seal is in the installed state, compression spring 12 generates the axial force required to hold the slide ring 1 sealingly against a counter ring or a corresponding sealing face (not shown). Spring 12 is approximately conical and has a rectangular wire cross section. The individual spring turns 13, 14 and 15 of spring 12 are arranged in different radial and axial planes. The turns 13 and 15, which are effective in opposite directions, exert a defined radial force on the bellows 4 and on the adhering part 8, respectively. By virtue of this arrangement, the slide ring 1 is held radially secure by the bellows 4 and the adhering part 8, in the mounted state of the slide ring seal, is securely held in the receptacle member. Moreover, an optimum transmission of torque between the slide ring 1 and the adhering part 8 is assured without any additional parts.

Figure 2:
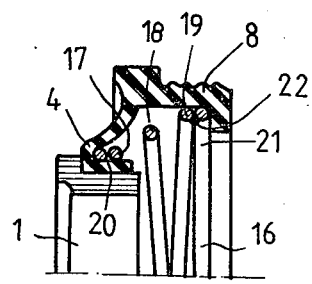
FIG. 2 is an axial sectional view of another preferred embodiment of the invention.

In the embodiment shown in FIG. 2, the slide ring 1 and the sleeve member formed of bellows 4 and adhering part 8 are identical to the FIG. 1 embodiment. The FIG. 2 embodiment comprises a generally conical spring 16 having a circular wire cross section. In addition to consecutive spring turns 17, 18 and 19 which follow the surface of an imaginary cone, spring turns 20, 21 are provided, respectively, adjacent adhering part 8 as well as adjacent U-shaped portion 4" of bellows 4. In order to ensure stability in a radial as well as an axial direction, turns 20 and 21 are so wound that an axial bias prevails between turns 20 and 17 and between turns 21 and 19. Depending on the intended application and the axial dimensions of the adhering part 8, it may be expedient to provide more than two axially consecutive turns similarly to the spring 12 of the FIG. 1 embodiment. The spring 16 has the purpose to radially press bellows 4 against the slide ring 1 and to ensure a secure seating of the adhering part 8 in the receiving member. In order to prevent the penultimate spring turn 19 from jumping axially out from under the last spring turn 21 under axial pressure of the slide ring seal when the slide ring seal is in the mounted state thus inhibiting the operation of spring 16, the spring turns 19 and 21 are connected to one another in several places along their circumference by means of spot welds 22.

Figures 2A, 3:
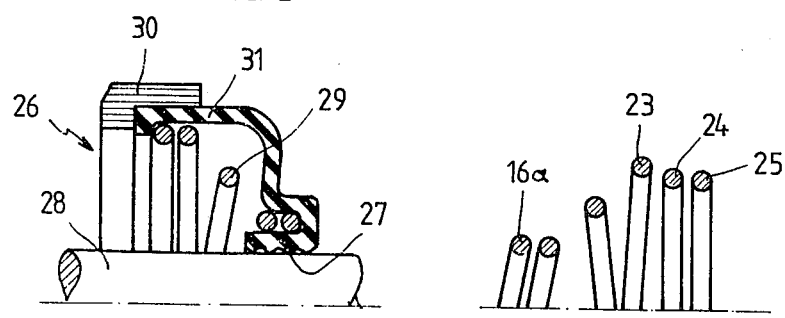
FIG. 2a is an axial sectional view of a variant of a component forming part of the structure illustrated in FIG. 2.
FIG. 3 is an axial sectional view of a further preferred embodiment of the invention.

FIG. 2a shows a further variation of the conical spring 16 of the FIG. 2 embodiment. Spring 16a is provided with three turns 23, 24, 25 positioned adjacent the adhering part (not shown in FIG. 2a). The turns 24 and 25 have the same diameter and are symmetrical with the spring axis, while the turn 23 is wound eccentrically thereto in the direction of the adhering member.

Turning now to FIG. 3, the slide ring seal 26 has a tubular sleeve member, whose adhering part 27 is radially pressed against a shaft 28. Similarly to the earlier-described embodiments, a spring 29 exerts radially opposite forces on the bellows 31 which in this embodiment is positioned in slide ring 30 and on the adhering part 27.

It will be understood that the above description of the present invention is susceptible to various modifications, changes and adaptations, and the same are intended to be comprehended within the meaning and range of equivalents of the appended claims.

What is claimed is:

1. A slide ring seal comprising a slide ring having a central axis and a circumferential face; a tubular sleeve member comprising a bellows overlapping at least a portion of said circumferential face and an adhering part integral with said bellows and extending axially from said slide ring; and a compression spring approximately conical in configuration positioned within said tubular sleeve member comprising at least three spring turns positioned in different radial planes with respect to said central axis, at least two of said spring turns having different diameters, and wherein the spring turns having the smallest and largest diameter cooperate with said adhering part and that portion of said bellows which overlaps said slide ring to radially bias said slide ring seal in opposite radial directions.

2. A slide ring seal as defined in claim 1, wherein each spring turn cooperating with said adhering part exerts a greater radial force than the radial force exerted by each spring turn cooperating with said bellows.

3. A slide ring seal as defined in claim 1, wherein the area enclosed by each of said spring turns has a different size.

4. A slide ring seal as defined in claim 1, wherein said spring turns positioned in the zone of said bellows are wound eccentrically.

5. A slide ring seal as defined in claim 1, wherein said spring turns positioned in the zone of said adhering part are wound eccentrically.

6. A slide ring seal as defined in claim 1, wherein said spring has a square wire cross section.

7. A slide ring seal as defined in claim 1, wherein said spring has a rectangular wire cross section.

8. A slide ring seal as defined in claim 1, wherein at least two consecutive spring turns are positioned in the zone of said adhering part and are wound to exert an axial bias on one another.

9. A slide ring seal as defined in claim 8, wherein said at least two consecutive spring turns engage said adhering part and exert a radial force thereon.

10. A slide ring seal as defined in claim 1, wherein at least two consecutive spring turns are positioned in the zone of said bellows and are wound to exert an axial bias on one another.

11. A slide ring seal as defined in claim 10, wherein said at least two consecutive spring turns engage said bellows and exert a radial force thereon.

12. A slide ring seal as defined in claim 1, wherein said compression spring includes an interior spring turn positioned between the spring turns of said smallest and largest diameter and wherein said interior spring turn has a radial height equal to the radial height of said smallest spring turn plus approximately one-half the difference in radial height between the spring turns of said smallest and largest diameter.

13. A slide ring seal as defined in claim 12, wherein said interior spring turn is axially positioned along said central axis approximately halfway between the spring turns of said smallest and largest diameter.

14. A slide ring seal as defined in claim 1, wherein at least two spring turns are fixed to one another and are in engagement with said bellows.

15. A slide ring seal as defined in claim 14, wherein said at least two spring turns which are fixed to one another are welded together.

16. A slide ring seal as defined in claim 14, wherein said at least two spring turns which are fixed to one another are glued together.

17. A slide ring seal as defined in claim 1, wherein at least two spring turns are fixed to one another and are in engagement with said adhering part.

18. A slide ring seal as defined in claim 17, wherein said at least two spring turns which are fixed to one another are welded together.

19. A slide ring seal as defined in claim 17, wherein said at least two spring turns which are fixed to one another are glued together.

* * * * *